United States Patent
Kwon et al.

(10) Patent No.: US 11,137,319 B2
(45) Date of Patent: Oct. 5, 2021

(54) METHOD FOR UPDATING CRANK POSITION SENSOR SIGNAL IN VEHICLE ENGINE

(71) Applicants: Hyundai Motor Company, Seoul (KR); Kia Motors Corporation, Seoul (KR)

(72) Inventors: Hyeokjun Kwon, Seoul (KR); Kyongduck Park, Busan (KR); Jung-Suk Han, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 354 days.

(21) Appl. No.: 16/179,953

(22) Filed: Nov. 4, 2018

(65) Prior Publication Data
US 2019/0178752 A1 Jun. 13, 2019

(30) Foreign Application Priority Data
Dec. 11, 2017 (KR) .................. 10-2017-0169279

(51) Int. Cl.
*G01M 15/06* (2006.01)
*F02P 7/07* (2006.01)
*G01D 5/14* (2006.01)

(52) U.S. Cl.
CPC .............. *G01M 15/06* (2013.01); *F02P 7/07* (2013.01); *G01D 5/147* (2013.01)

(58) Field of Classification Search
CPC ............ F02D 1/00; B60W 10/00; G05D 1/00
See application file for complete search history.

(56) References Cited

U.S. PATENT DOCUMENTS

| | | | | |
|---|---|---|---|---|
| 2005/0263138 A1* | 12/2005 | Sheikh | ............... | F02B 77/087 123/476 |
| 2006/0167615 A1* | 7/2006 | Kunibe | ............... | F02D 41/222 701/114 |
| 2007/0256482 A1* | 11/2007 | Sheikh | ............... | G01M 15/06 73/114.26 |
| 2008/0022760 A1* | 1/2008 | McDaniel | ............. | F02D 41/042 73/114.77 |
| 2014/0107903 A1* | 4/2014 | Kawazu | ............. | F02D 41/0097 701/101 |
| 2014/0336909 A1* | 11/2014 | Doit | .................... | F02N 11/0855 701/113 |

* cited by examiner

Primary Examiner — Jermele M Hollington
Assistant Examiner — Temilade S Rhodes-Vivour
(74) Attorney, Agent, or Firm — Mintz Levin Cohn Ferris Glovsky and Popeo, P.C.; Peter F. Corless

(57) ABSTRACT

A method for updating a crank position tooth number in a crank position sensor signal obtained from a crankshaft position sensor of an engine of a vehicle includes: calculating, in platform software of an engine control unit (ECU), a pulse width of a crank position sensor signal, determining, in the platform software of the ECU, a forward rotation and a reverse rotation of an engine, and updating, in the platform software of the ECU, the crank position tooth number.

14 Claims, 5 Drawing Sheets

METHOD FOR UPDATING CRANK POSITION SENSOR SIGNAL IN VEHICLE ENGINE

CROSS-REFERENCE TO RELATED APPLICATION

This application claims under 35 U.S.C. § 119(a) the benefit of Korean Patent Application No. 10-2017-0169279, filed on Dec. 11, 2017, the entire contents of which are incorporated herein by reference.

BACKGROUND

(a) Technical Field

The present disclosure relates to a method for updating a crank position sensor signal, more particularly, to a method for updating a crank position tooth number of the crank position sensor signal using a pulse width characteristic of a hole type crankshaft position sensor.

(b) Description of Related Art

An engine control unit (ECU) is a device configured to calculate a fuel injection timing and an ignition timing of an engine by determining a rotational position of the engine and control an injector and an igniter to be driven at corresponding timings. As shown in FIG. 1 (RELATED ART), the ECU is configured with a microcontroller, platform software including complex drivers, and application software, and information is exchanged between the platform software and the application software through an application programming interface (API) call.

The ECU receives a signal from a crankshaft position sensor to update a crank position tooth number so as to determine the rotational position of the engine, and specifically, in a related art using a Hall type crankshaft position sensor, the crank position tooth number is updated through a series of following operations as shown in FIG. 2 (RELATED ART).

1. An electrical signal generated from the crankshaft position sensor according to a rotation of the engine flows into the microcontroller (S10).
2. The microcontroller generates an interrupt service routine (ISR) in response to the electrical signal (S20).
3. An engine position management (EPM) driver calculates a pulse width of a crank position sensor signal using ISR information (S30).
4. The application software receives pulse width information calculated by the EPM driver through an API call at every 10 ms task (S40).
5. The application software determines a forward rotation and a reverse rotation of the engine using the pulse width information (a value of the pulse width is varied according to the forward rotation and the reverse rotation of the engine due to a characteristic of the Hall type crankshaft position sensor) (S50).
6. The EPM driver receives information on the forward rotation and the reverse rotation, which is determined by the application software, through the API call (S60).
7. The EPM driver updates the crank position tooth number using the information on the forward rotation and the reverse rotation (S70).

That is, according to the related art, when the crank position tooth number is updated, the application software determines the forward rotation and the reverse rotation using the pulse width information of the Hall type crank position sensor signal, which is calculated by the EPM driver, and then the EPM driver updates again the crank position tooth number using the pulse width information.

However, in the related art, the API call is performed twice in the order of the EPM driver→the application software→the EPM driver, such that there is a problem in that omission in updating of the crank position tooth number may occur due to a difference in task between the two API calls.

FIG. 3 (RELATED ART) is a diagram illustrating an example of updating the crank position tooth number according to the related art, which has the above-described problem, and it can be seen from the example that the application software determines three crankshaft reverse rotation teeth as being a forward rotation such that six tooth errors occur.

SUMMARY

An embodiment of the present disclosure is directed to a method for updating a crank position tooth number in a crank position sensor signal, which is capable of reducing an execution time and preventing omission of information due to a difference in task by allowing an engine position management (EPM) driver to calculate a pulse width of the crank position sensor signal, determine a forward rotation and a reverse rotation of an engine, and update the crank position tooth number with no application programming interface (API) call between application software and the EPM driver.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a method for updating a crank position tooth number in a crank position sensor signal includes: calculating, in platform software of an engine control unit (ECU), a pulse width of a crank position sensor signal, determining, in the platform software of the ECU, a forward rotation and a reverse rotation of an engine, and updating, in the platform software of the ECU, the crank position tooth number.

Preferably, calculating the pulse width of the crank position sensor signal, determining the forward rotation and the reverse rotation of the engine, and updating the crank position tooth number may be performed in an engine position management (EPM) driver of the platform software.

Preferably, calculating the pulse width of the crank position sensor signal may include calculating the pulse width using interrupt service routine (ISR) information generated by a microcontroller of the platform software in response to an electrical signal generated from a crankshaft position sensor.

Preferably, the crankshaft position sensor may be a Hall type crankshaft position sensor.

Preferably, determining the forward rotation and the reverse rotation of the engine may be performed using a variation in value of the pulse width of the crank position sensor signal according to the forward rotation and the reverse rotation of the engine.

Preferably, updating the crank position tooth number may include increasing the crank position tooth number in the case of the forward rotation and decreasing the crank position tooth number in the case of the reverse rotation according to the result of the determining of the forward rotation and the reverse rotation of the engine.

In accordance with another embodiment of the present disclosure, a method for updating a crank position tooth number in a crank position sensor signal includes: receiving a crank position sensor signal, generating an interrupt service routine (ISR), calculating a pulse width of the crank position sensor signal, determining a forward rotation and a reverse rotation of an engine, and updating the crank position tooth number, wherein the receiving of the crank position sensor signal, the generating of the ISR, the calculating of the pulse width of the crank position sensor signal, the determining of the forward rotation and the reverse rotation of the engine, and the updating of the crank position tooth number are performed in platform software of an engine control unit (ECU).

Preferably, receiving the crank position sensor signal and generating the ISR may be performed in a microcontroller of the platform software, and calculating the pulse width of the crank position sensor signal, determining othe forward rotation and the reverse rotation of the engine, and updating the crank position tooth number may be performed in an engine position management (EPM) driver of the platform software.

Preferably, receiving the crank position sensor signal may include receiving, in the microcontroller, an electrical signal generated from a crankshaft position sensor according to a rotation of the engine.

Preferably, generating the ISR may include generating the ISR, in the microcontroller, in response to the electrical signal.

Preferably, calculating the pulse width of the crank position sensor signal may include calculating, in the EPM driver, the pulse width of the crank position sensor signal using ISR information.

Preferably, determining the forward rotation and the reverse rotation of the engine may include determining, in the EPM driver, the forward rotation and the reverse rotation of the engine using a variation in value of the pulse width of the crank position sensor signal due to the forward rotation and the reverse rotation of the engine.

Preferably, updating the crank position tooth number may include updating, in the EPM driver, the crank position tooth number according to the result of the determining of the forward rotation and the reverse rotation of the engine.

Preferably, updating the crank position tooth number may include increasing the crank position tooth number in the case of the forward rotation and decreasing the crank position tooth number in the case of the reverse rotation according to the result of the determining of the forward rotation and the reverse rotation of the engine.

In accordance with a further embodiment of the present disclosure, a non-transitory computer readable medium containing program instructions executed by a processor includes: program instructions that calculate a pulse width of a crank position sensor signal; program instructions that determine a forward rotation and a reverse rotation of an engine; and program instructions that update to crank position tooth number in the crank position sensor signal.

DESCRIPTION OF SPECIFIC EMBODIMENTS

Figure 1:
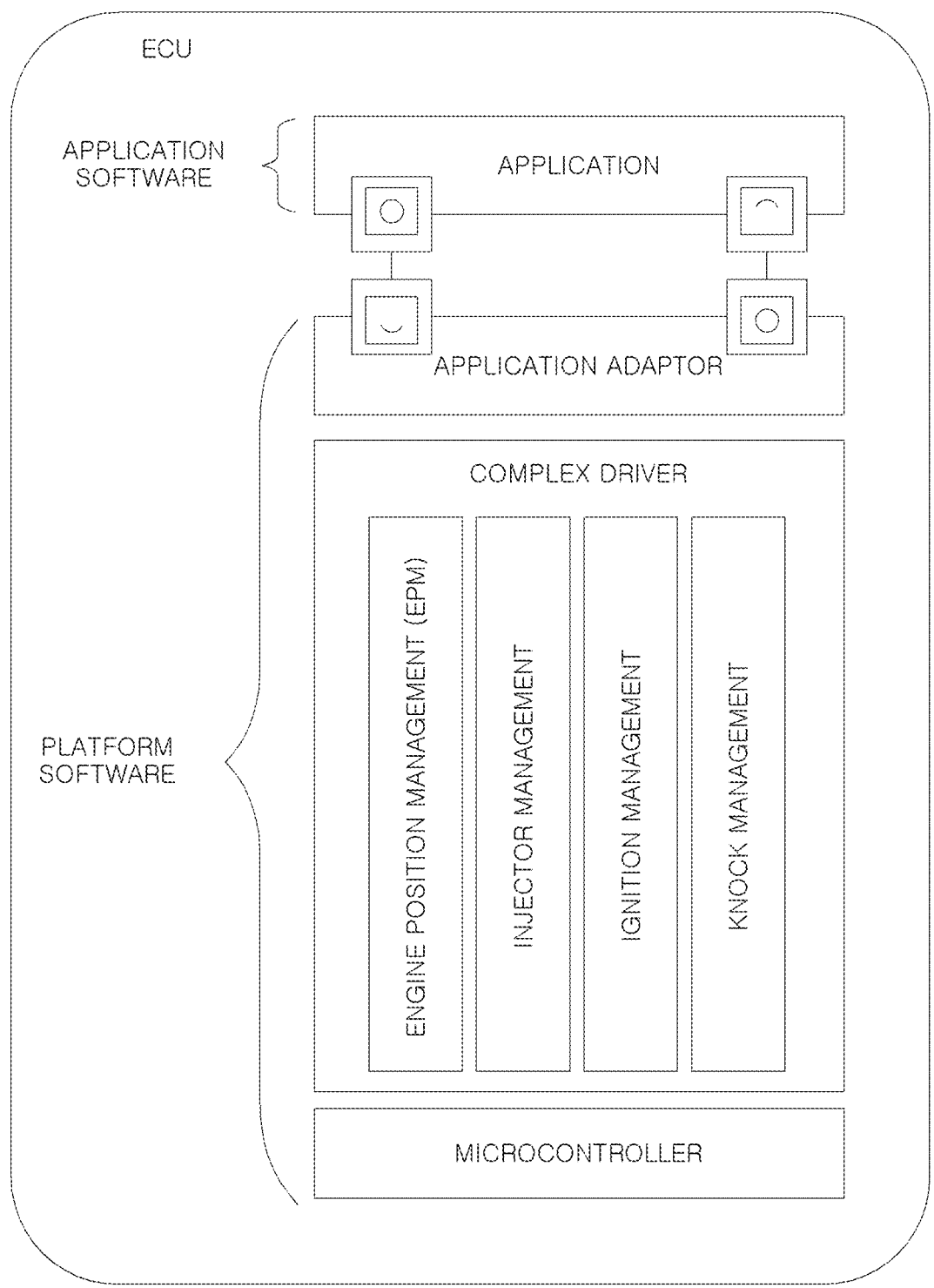
FIG. 1 (RELATED ART) is a block diagram of an engine control unit (ECU).
Figure 2:
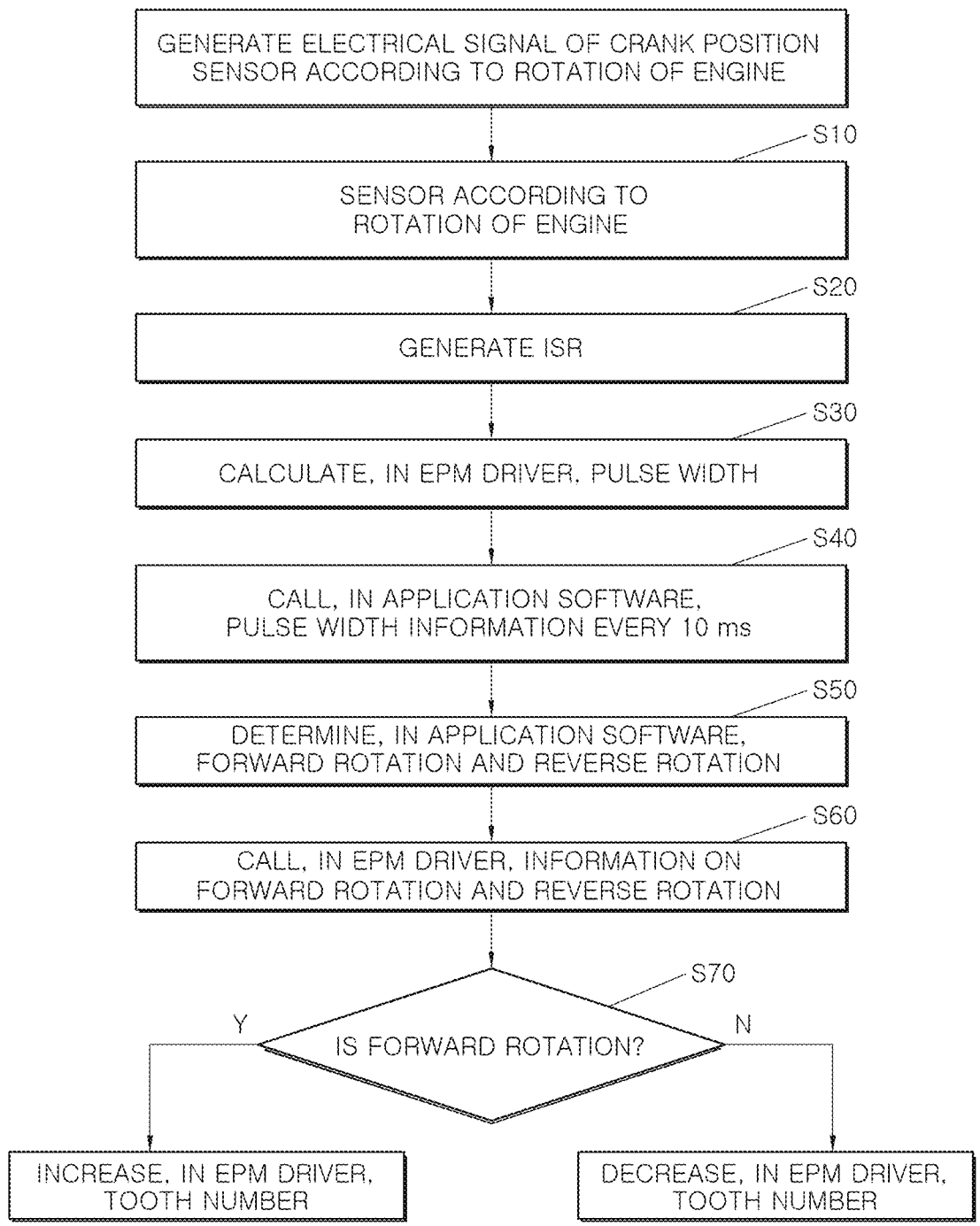
FIG. 2 (RELATED ART) is a flowchart illustrating a method for updating a crank position tooth number in a crank position sensor signal according to a related art.
Figure 3:
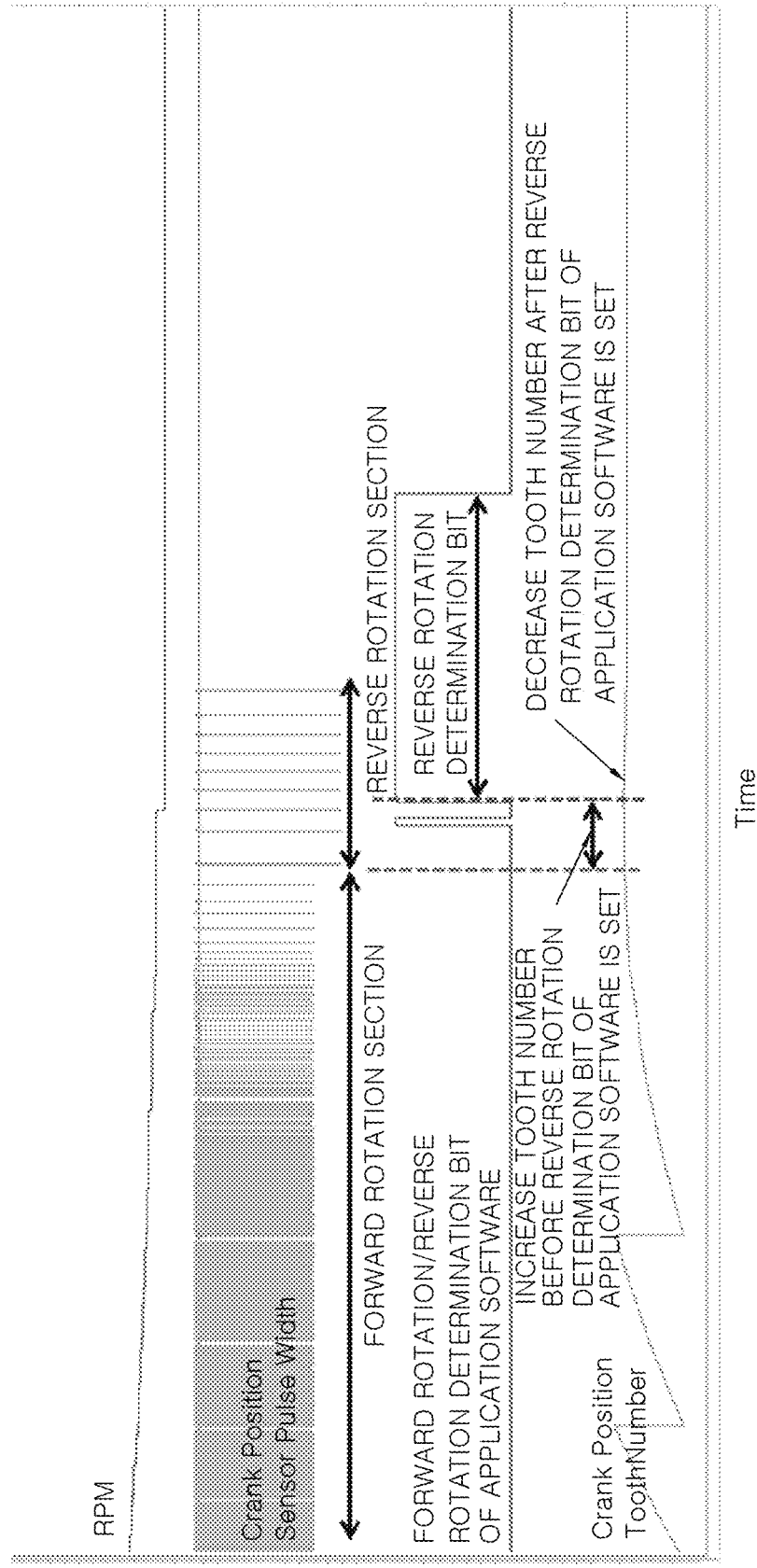
FIG. 3 (RELATED ART) is a diagram illustrating an example of updating a crank position tooth number in a crank position sensor signal according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a method for updating a crank position tooth number in a crank position sensor signal according to the present disclosure will be described in detail with reference to the accompanying drawings. However, if it is determined that known functions and configurations may unnecessarily obscure the gist of the present disclosure, detailed descriptions thereof will be omitted.

FIG. 4 is a flowchart illustrating a method for updating a crank position tooth number in a crank position sensor signal according to the present disclosure.

Figure 4:
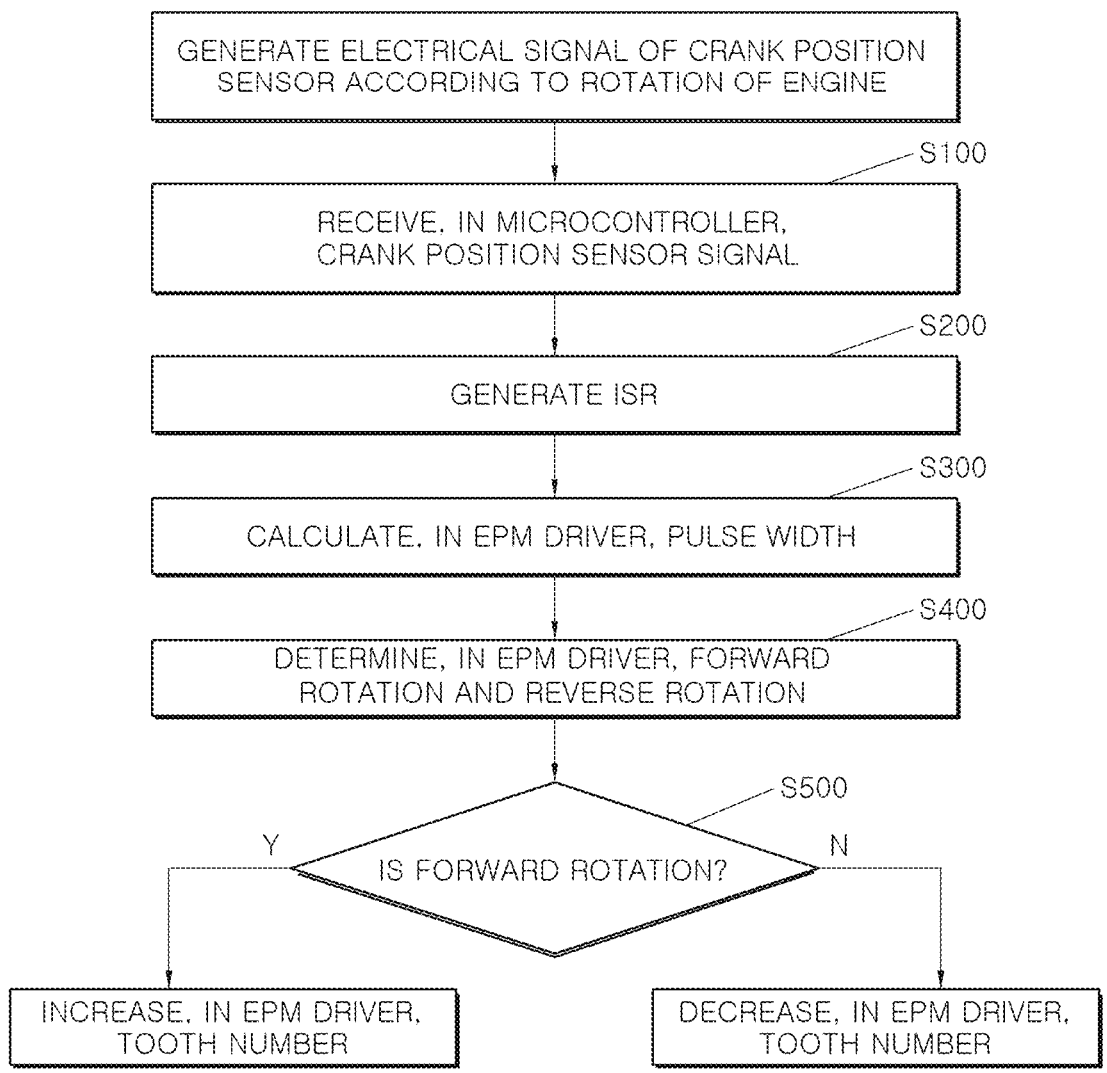
FIG. 4 is a flowchart illustrating a method for updating a crank position tooth number in a crank position sensor signal according to the present disclosure.

Referring to FIG. 4, the method for updating a crank position tooth number in a crank position sensor signal according to the present disclosure includes receiving a crank position sensor signal (S100), generating an interrupt service routine (ISR) (S200), calculating a pulse width (S300), determining a forward rotation and a reverse rotation of an engine (S400), and updating a crank position tooth number (S500).

The receiving of the crank position sensor signal (S100) includes receiving, in a microcontroller, an electric signal generated from a crankshaft position sensor according to a rotation of the engine.

The generating of the ISR (S200) includes generating, in the microcontroller, the ISR in response to the electrical signal.

The calculating of the pulse width (S300) includes calculating, in an engine position management (EPM) driver, a pulse width of the crank position sensor signal using ISR information.

The determining of the forward rotation and the reverse rotation of the engine (S400) includes determining, in the EPM driver, the forward rotation and the reverse rotation of the engine according to the calculated pulse width using a variation in value of the pulse width due to a characteristic of a Hall type crankshaft position sensor.

The updating of the crank position tooth number (S500) includes updating, in the EPM driver, the crank position tooth number according to the determination result for the forward rotation and the reverse rotation. At this point, the updating of the crank position tooth number (S500) includes increasing the crank position tooth number in the case of the forward rotation and decreasing the crank position tooth number in the case of the reverse rotation.

Unlike the related art, the method for updating a crank position tooth number according to the present disclosure performs all the operations in the microcontroller and the EPM driver inside platform software, such that an application programming interface (API) call between the platform software and application software do not occur when the crank position tooth number is updated. Accordingly, the present disclosure can prevent omission of information due to a difference in task between the API calls, thereby minimizing an error of the crank position tooth number.

In other words, since the application software is driven in a polling manner due to a characteristic of an engine control unit (ECU), the application software may not determine the forward rotation and the reverse rotation until a latest time task is performed even though the reverse rotation has actually occurred, but the EPM driver may be driven in an interrupt manner such that the EPM driver may determine the forward rotation and the reverse rotation whenever the ISR for a crank position occurs to immediately reflect the determination result to the updating of the crank position tooth number.

Figure 5:
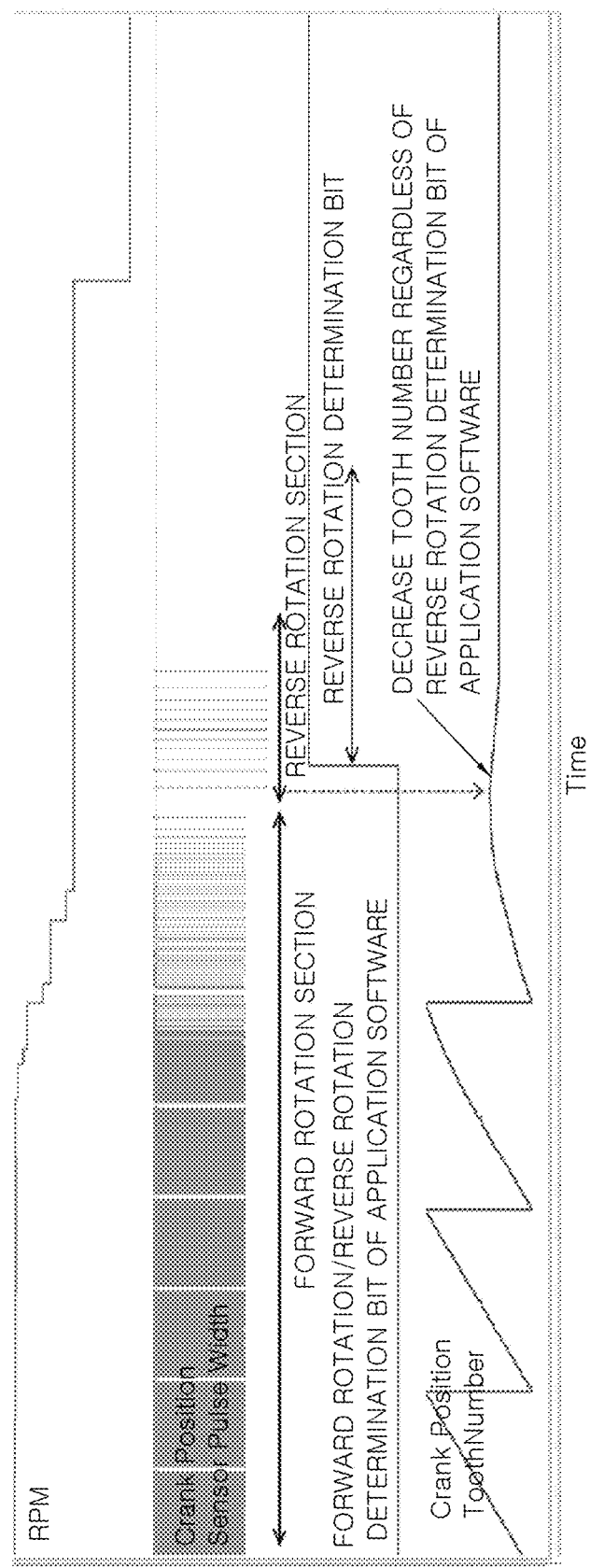
FIG. 5 is a diagram illustrating an example of updating a crank position tooth number in a crank position sensor signal according to the present disclosure.

FIG. 5 is a diagram illustrating an example of updating a crank position tooth number according to the present disclosure. Referring to FIG. 5, according to the present disclosure, it can be seen that a tooth error does not occur since the EPM driver immediately determines the forward rotation and the reverse rotation whenever the crank ISR occurs and updates the crank position tooth number regardless of the application software. Meanwhile, it can be seen that the application software cannot detect two reverse rotation teeth due to a delay resulting from the API call and information omission resulting from the polling manner.

In accordance with the method for updating a crank position tooth number according to the present disclosure, it is possible to improve accuracy of the crank position tooth number by determining, in the platform software, the forward rotation and the reverse rotation of the engine, wherein a conventional method performs the determining in the application software.

Further, in accordance with the method for updating a crank position tooth number according to the present disclosure, it is possible to detect a stop position of the engine with no error without omission of the reverse rotation even when starting is turned off and thus a separate engine synchronization is not required when starting is turned on, such that cranking and an injection calculation can be simultaneously performed to reduce a starting completion time.

The embodiments disclosed herein and the accompanying drawings are used only for the purpose of easily describing the technical spirit of the present disclosure and are not intended to limit the scope of the present disclosure defined in the appended claims. Therefore, those skilled in the art will appreciate that various modifications and equivalent other embodiments can be derived without departing from the scope of the present disclosure.

What is claimed is:

1. A method for updating a crank position tooth number in a crank position sensor signal, the method comprising:
   calculating, in platform software of an engine control unit (ECU), a pulse width of the crank position sensor signal;
   determining, in the platform software of the ECU, a forward rotation and a reverse rotation of an engine; and
   updating, in the platform software of the ECU, the crank position tooth number,
   wherein the ECU comprises the platform software and application software.

2. The method of claim 1, wherein calculating the pulse width of the crank position sensor signal, the determining of the forward rotation and the reverse rotation of the engine, and the updating of the crank position tooth number are performed in an engine position management (EPM) driver of the platform software.

3. The method of claim 2, wherein calculating the pulse width of the crank position sensor signal includes calculating the pulse width using interrupt service routine (ISR) information generated by a microcontroller of the platform software in response to an electrical signal generated from a crankshaft position sensor.

4. The method of claim 1, wherein the crankshaft position sensor is a Hall type crankshaft position sensor.

5. The method of claim 4, wherein determining the forward rotation and the reverse rotation of the engine is performed using a variation in value of the pulse width of the crank position sensor signal according to the forward rotation and the reverse rotation of the engine.

6. The method of claim 5, wherein updating the crank position tooth number includes increasing the crank position tooth number in the case of the forward rotation and decreasing the crank position tooth number in the case of the reverse rotation according to the result of the determining of the forward rotation and the reverse rotation of the engine.

7. A method for updating a crank position tooth number in a crank position sensor signal, the method comprising:
  receiving the crank position sensor signal;
  generating an interrupt service routine (ISR);
  calculating a pulse width of the crank position sensor signal;
  determining a forward rotation and a reverse rotation of an engine; and
  updating the crank position tooth number,
  wherein receiving the crank position sensor signal, generating the ISR, calculating the pulse width of the crank position sensor signal, determining the forward rotation and the reverse rotation of the engine, and updating the crank position tooth number are performed in platform software of an engine control unit (ECU), and
  wherein the ECU comprises the platform software and application software.

8. The method of claim 7, wherein:
  receiving the crank position sensor signal and generating the ISR are performed in a microcontroller of the platform software, and
  calculating the pulse width of the crank position sensor signal, determining othe forward rotation and the reverse rotation of the engine, and updating the crank position tooth number are performed in an engine position management (EPM) driver of the platform software.

9. The method of claim 8, wherein receiving the crank position sensor signal includes receiving, in the microcontroller, an electrical signal generated from a crankshaft position sensor according to a rotation of the engine.

10. The method of claim 9, wherein generating the ISR includes generating the ISR, in the microcontroller, in response to the electrical signal.

11. The method of claim 10, wherein calculating the pulse width of the crank position sensor signal includes calculating, in the EPM driver, the pulse width of the crank position sensor signal using ISR information.

12. The method of claim 11, wherein determining the forward rotation and the reverse rotation of the engine includes determining, in the EPM driver, the forward rotation and the reverse rotation of the engine using a variation in value of the pulse width of the crank position sensor signal due to the forward rotation and the reverse rotation of the engine.

13. The method of claim 12, wherein updating the crank position tooth number includes updating, in the EPM driver, the crank position tooth number according to the result of the determining of the forward rotation and the reverse rotation of the engine.

14. The method of claim 13, wherein updating the crank position tooth number includes increasing the crank position tooth number in the case of the forward rotation and decreasing the crank position tooth number in the case of the reverse rotation according to the result of the determining of the forward rotation and the reverse rotation of the engine.

* * * * *